United States Patent [19]

Nielsen

[11] Patent Number: 5,266,473
[45] Date of Patent: Nov. 30, 1993

[54] METHOD FOR DECREASING THE ALLERGENICITY OF PSYLLIUM SEED HUSK BY ENZYME TREATMENT

[75] Inventor: Susan Nielsen, Battle Creek, Mich.

[73] Assignee: Kellogg Company, Battle Creek, Mich.

[21] Appl. No.: 826,713

[22] Filed: Jan. 28, 1992

[51] Int. Cl.$^5$ .................. A23G 1/02; A23L 1/36; C07G 17/00; C12N 9/50

[52] U.S. Cl. .................. 435/219; 435/212; 435/267; 426/44

[58] Field of Search .................. 435/219, 267, 212; 426/44

[56] References Cited

U.S. PATENT DOCUMENTS

| | | | |
|---|---|---|---|
| 4,004,979 | 1/1977 | Avrameas et al. | 435/176 |
| 4,266,031 | 5/1981 | Tang et al. | 435/188 |
| 4,321,263 | 3/1982 | Powell et al. | 424/195.1 |
| 4,459,280 | 7/1984 | Colliopoulos et al. | 424/493 |
| 4,548,806 | 10/1985 | Colliopoulos et al. | 424/493 |
| 4,737,364 | 4/1988 | Kalogris | 424/195.1 |
| 4,766,004 | 8/1988 | Moskowitz | 426/658 |
| 4,813,613 | 3/1989 | Salete | 241/7 |
| 4,828,842 | 5/1989 | Furst et al. | 424/480 |
| 4,911,889 | 3/1990 | Leland et al. | 422/26 |
| 4,970,156 | 11/1990 | Avrameas et al. | 435/174 |
| 5,039,532 | 8/1991 | Jost et al. | 426/41 |
| 5,085,785 | 2/1992 | Reeves | 210/767 |

FOREIGN PATENT DOCUMENTS 0105195  8/1983  European Pat. Off. .

OTHER PUBLICATIONS

James et al. *J. Allerg. Clin. Immunology.* 88(3), pp. 402–408 (1991).
"A Closer Look at Dietary Fiber", Food Engineering, May 1985.
"A Forgotten Nautral Dietary Fiber: Psyllium Muciloid", Cereal Foods World, Nov. 1988, vol. 33, No. 11.

*Primary Examiner*—Douglas W. Robinson
*Assistant Examiner*—L. Blaine Lankford
*Attorney, Agent, or Firm*—Felfe & Lynch

[57] ABSTRACT

Disclosed is a method for reducing the allergenicity of psyllium seed husk by treatment with an enzyme. An aqueous slurry of psyllium seed husk is treated with the enzyme under conditions sufficient to inactivate the allergenic protein thus reducing the allergenicity of the psyllium seed husk.

5 Claims, No Drawings

METHOD FOR DECREASING THE ALLERGENICITY OF PSYLLIUM SEED HUSK BY ENZYME TREATMENT

BACKGROUND OF THE INVENTION

1. Field of the Invention

The present invention relates to a novel method for reducing the allergenicity of psyllium seed husk by treating the psyllium seed husk with an enzyme.

2. Discussion of the Background

Psyllium is a known mucilaginous material which has been used extensively in bulk laxatives. More recently, psyllium has been found to have a hypocholesterolemic effect if ingested by humans and animals.

The source of psyllium is the seeds from the plants of the Plantago genus, which grows in certain subtropical regions. The seeds are dark brown, smooth, boat-shaped and shiny. Since it is believed by those skilled in the art that the active ingredient of psyllium is the psyllium seed gum, which is located primarily in the seed husk, present technology uses the ground seed husk as a source for psyllium.

Generally, psyllium seeds are coarsely ground with crude grinding equipment in India and subtropical regions where the psyllium seeds originate, in an attempt to separate the outermost husk material from the underlying pigmented seed coat layer of the psyllium seeds. In this crude grinding process, particles of various size from these layers are mixed with one another as a function of the grinding process. Because of the type and condition of the grinding equipment and variability in the physical dimensions of the psyllium seeds themselves, it is common to have discrete pieces of seed coat mixed in with husk material.

Various methods and apparatus for obtaining high purity mucilage or husk material from psyllium seeds have been proposed. For example, U.S. Pat. No. 4,813,613 discloses a complex apparatus for producing powdered psyllium seed husk including a plurality of impact grinding steps.

Psyllium compositions have been incorporated into food products for many years (J. K. C. Chan, V. Wypyszyk, Cereal Foods World, 1988, 33: 919-922). Such food products include cookie compositions containing flours, sugars, oils, etc, dry mixes for the preparation of baked goods, particularly muffins, psyllium containing dietary aids, and ready-to-eat cereal.

Exposure to psyllium seed husk powder can cause IgE sensitization and IgE-mediated allergic reactions in sensitized individuals (J. D. Bardy, J. L. Malo, P. Seguin, Am. Rev. Respir. Dis., 1987, 135 1033-1038). Most allergic reactions occur following ingestion of psyllium products, in particular, psyllium-containing bulk laxatives (J. S Seggev, K. Ohta, W. R. Tipton, Ann. Allergy, 1984, 43:325-326)

The psyllium seed comprises a substantially centrally located germ, an endosperm surrounding the germ, a relatively thin colored seed coat (bran) surrounding the endosperm and a husk surrounding the colored seed coat. A protein extract containing allergenic proteins can be obtained by extraction of the husk containing the proteins.

It has now been discovered that the seed coat material from psyllium seeds, in general, is high in specific protein fractions which contain allergens. As noted above, it is common to have discrete pieces of the seed coat material mixed in with coarsely ground psyllium seed husk. The present invention provides a novel, convenient and simple method for treating coarsely ground psyllium seed husk to decrease the allergenicity of the seed husk. The process of the present invention directly treats psyllium seed husk compositions to produce a psyllium seed husk which retains its food quality characteristics and yet has reduced allergenicity.

SUMMARY OF THE INVENTION

The present invention provides a method for selectively decreasing the allergenicity of psyllium seed husk compositions without substantially altering the psyllium seed husk foodstuff qualities in which a psyllium seed husk composition is treated with an enzyme to inactivate the allergenic proteins thus reducing the allergenicity of the psyllium seed husk.

Preferably, the enzyme is a protease (proteolytic) enzyme which inactivates the protein by degrading or cleaving the allergenic proteins.

DESCRIPTION OF PREFERRED EMBODIMENT

The method of the present invention provides a way of treating psyllium seed husk to reduce allergenicity.

In the method of the invention, the psyllium seed husk is contacted with an aqueous solution of a proteolytic (protease) enzyme under temperature and pH conditions at which the proteolytic enzyme is enzymatically active. The psyllium seed husk, which is commercially obtained and contains allergenic seed coat proteins, is first slurried with water, buffered, if necessary, to a pH at which the protease is enzymatically active and then treated with the protease at a suitable temperature for a time sufficient to allow the protease to degrade the allergenic proteins present in the psyllium seed husk composition. The resulting psyllium seed husk composition has substantially reduced allergenicity and may be used in the preparation of foodstuffs using conventional methods.

Optionally the psyllium seed husks can be separated from the aqueous solution prior to further processing of the psyllium husks.

Psyllium seed husk compositions typically contain many complex biochemical components in the husk, seed coat, etc. Surprisingly, the present method allows one to substantially reduce the allergenicity of the psyllium compositions without generating toxic decomposition products or reducing the food quality of the psyllium seed husk composition.

According to the invention, psyllium seed husk is slurried with water to provide a slurry containing about 1-50 wt. % solids, preferably about 5-30 wt. % solids. If desired, the psyllium seed husk may be soaked or contracted with water in the slurry to allow softening of the psyllium seed husk composition and more effective interaction between the allergenic proteins and the enzymes to be added. The allergenic proteins are generally soluble in water and, accordingly, readily available for reaction with proteolytic enzymes. Although the psyllium seed husk may be soaked in water for substantially long periods of time, if desired, it is economically preferable to soak the seed husk composition for as short a time period as necessary to adequately solubilize the allergenic proteins. Generally, soaking times ranging from about 1 minute to about 30 minutes are adequate.

The pH of the aqueous psyllium seed husk slurry may be adjusted to a pH at which the proteolytic enzyme is active, if necessary. Obviously, the specific pH to which the slurry is adjusted will depend upon the specific protease or mixture of proteases which are added to the slurry. In general, proteases are active in the pH range from about 2 to about 10. The pH range at which any particular protease is active can be readily determined by one having ordinary skill in the art by measuring enzymatic activity of the protease over a range of pH values. Alternatively, many protease preparations are commercially available with extensive existing biological data characterizing the suitable pH ranges for optimal activity of the specific enzyme preparations.

The pH of the aqueous slurry may be adjusted by the addition of buffers, acids, bases or salts in a conventional manner to obtain the desired pH of the aqueous slurry. Suitable buffers include carbonate, bicarbonate, phosphate, pyrophosphate, tartaric acid, acetate and citrate Suitable commercially available buffers include phosphate buffered saline (PBS) solutions. Other buffers may be suitable for certain applications such as laboratory applications. These include ethanolamine buffers, 3-(N-morpholino)propanesulfonic acid (MOPS) buffer and TRIS(Sigma) buffer (tris-(hydroxy methyl)amino methane). Any buffer which allows for the dissolution of allergenic proteins into the slurry and is capable of adjusting the slurry pH to the desired range may be used in the present method.

The buffer is added to the slurry in an amount sufficient to adequately buffer the slurry to the desired pH range. In a preferred embodiment, the slurry is adjusted to a pH of 6-7 by means of a phosphate buffer.

If desired, a calcium salt may be added to the slurry. Calcium ions improve the activity of many proteases. Suitable calcium salts include calcium chloride, calcium carbonates, calcium bicarbonates, etc. The calcium salt is generally added to the slurry in amounts ranging from about 0.01-5 wt. %, preferably about 0.1-2 wt. % based on the aqueous slurry.

Proteolytic enzymes which may be used in the process of the present invention include any protease which is capable of enzymatically degrading the allergenic proteins present in the psyllium seed coat. These proteases are classified by the International Union of Biochemistry (IUB) in class 3.4, including subclasses 3.4.1($\alpha$-amino-acyl-peptide hydrolases), 3.4.2 (peptidyl-amino-acid hydrolases), 3.4.3 (dipeptide hydrolases) and 3.4.4 (peptidyl-peptide hydrolases). The protease may be obtained from any source including plants, animals, fungi and bacteria and includes both exoproteases as well as endoproteases. Exoproteases hydrolyze peptide bonds at the end of a peptide chain, whereas endoproteases hydrolyze peptide bonds in the interior of a peptide chain. Suitable proteases are the serine proteases, sulfhydryl proteases and metalloproteases. When a metalloprotease is utilized, the enzymatic activity is dependent upon the presence of a specific metal ion and, accordingly, the metal ion must be provided as an additive to the aqueous slurry. Generally, the metal ions are added to the slurry in the form of water soluble salts of the metal ion. Typical metalloenzymes require magnesium, zinc, cobalt, iron, copper, and nickel and these metal ions may be provided as the corresponding halides, carbonates, bicarbonates, etc., in amounts sufficient to provide enzymatic activity. Specific enzymes which may be used in the present process include trypsin, elastase, chymotrypsin, subtilisin, papain, bromelain, ficin, carboxypeptidase, amino peptidases, and the acid proteases rennin and pepsin. Mixtures of the proteases may be used in the present method and are preferred, particularly where the individual proteases cleave polypeptides at differing amino acids. These mixtures of proteases provide optimal degradation of the allergenic proteins found in psyllium seed husk compositions.

The protease is added to the slurry in an amount sufficient to reduce the allergenicity of the psyllium seed husk composition. Generally, the protease is added in an amount ranging from about 100 to about 2,000 IU per liter, preferably about 200-500 IU per liter, of slurry. Obviously, the enzyme may be added in amounts above or below this preferred range. However, utilization of substantially lower amounts of enzyme result in reaction times which are not economical. Use of substantially larger amounts of enzyme is needlessly expensive. In general, use of greater amounts of enzyme increases the initial rate at which the allergenicity is reduced in the psyllium seed husk composition, although a uniform reduction of allergenicity is generally obtained if a sufficient amount of time is available for the enzyme to react with the proteins present in the psyllium seed husk composition. The preferred range, therefore, provides a balance between cost and efficiency in the present process.

The protease enzyme may be added to the slurry in the form of a dry commercially available powder or as a dispersion or solution in aqueous buffer. The treated slurry can be gently agitated or stirred during the enzymatic treatment to allow the enzyme to react with all available allergenic protein. Stirring or agitation is not required but facilitates the present process.

The course of the reaction may be monitored by sampling aliquots of the slurry mixture to determine the optimal reaction time for a particular reaction vessel, enzyme and slurry mixture. Allergenicity can be conveniently monitored by analyzing the sample aliquots for free amino nitrogen which is a measure of the amount of peptide bond hydrolysis which has occurred due to reaction of the protease with the allergenic protein. In general, higher free amino nitrogen values correspond with lower allergenicity. Reaction times ranging from about 15 minutes to about 3 hours, preferably about 0.5-2 hours are generally sufficient to adequately reduce the allergenicity of the psyllium seed husk composition. The reaction is conveniently carried out at temperatures ranging from about 25° C. to about 45° C., preferably about 37° C., although the specific temperature will be determined by the specific protease which is used in the process.

After the enzymatic reaction has been completed, the aqueous psyllium seed husk slurry may be dried by any suitable means to produce psyllium seed husk having reduced allergenicity. Suitable drying means are well known in the art.

The allergenicity of the treated psyllium seed husk can be determined by methods known in the art. As noted above, specific proteins in the psyllium seed are allergens. The allergenicity of the treated psyllium product can be determined by extracting residual proteins from the treated psyllium product and then determining the allergenicity of the extracted proteins by known electrophoresis and immunoblotting techniques (H. A. Sampson and S. K. Cooke, *J. Am. Coll. Nutrition*, 9 (4):410–417, John Wiley & Sons, Inc. (1990)). Immunoblotting allows one to determine the extent of IgE antibody binding to specific psyllium proteins, providing a measure of the allergenicity of psyllium protein fractions.

The dried psyllium seed husk obtained by the present process which exhibits significantly reduced allergenicity as compared to the initial ground psyllium seed husk, is then ready for use for any known purpose of psyllium seed husk, and is especially useful as an ingredient of a food additive and/or food product. The dried psyllium seed husk treated to reduce allergenicity according to the present method has an allergenicity which is reduced by about 30–100% relative to untreated dried psyllium seed husk. Preferably, the treated psyllium seed husk has an allergenicity which has been reduced by 60–100% relative to the untreated product.

The dried psyllium seed husk, which exhibits significantly decreased allergenicity as compared to the initial ground psyllium seed husk, is then ready for use for any known purpose of psyllium seed husk, and is especially useful as a laxative component in known laxative products and as an ingredient of a food additive and/or food product.

The dried psyllium seed husk of the present invention may be ground or powdered using conventional means to produce a free flowing powdered psyllium seed husk composition having reduced allergenicity. This free flowing powder may be used as a bulk laxative in solid form or may be dispersed in water or an aqueous beverage. The powdered psyllium has poor wetting capability, however, and must be vigorously mixed with aqueous fluids to produce a palatable dispersion. Accordingly, it is preferable to mix the dried psyllium powder with additives which promote dispersion of the psyllium powder in water or aqueous beverages. Suitable dispersion additives include sweeteners such as dextrose, as well as compositions for coating the psyllium seed powder to prepare formulations which are more easily dispersed in water or aqueous beverages. For example, improved dispersability is obtained when the psyllium seed powder is provided with a coating of a non-toxic water dispersable polymer or other material by methods known to those skilled in the art.

The free flowing psyllium seed husk powder of the present invention is substantially free of allergenicity caused by the presence of psyllium seed coat proteins. By "substantially free of allergenicity" as used herein, is meant a psyllium seed husk powder which does not contain proteins which are capable of binding to IgE antibodies which specifically bind antigenic psyllium seed coat proteins described in J. M. James et al, J. Allergy Clin. Immun., 88, (3):402–408 (1991).

As described above, the psyllium seed husk subjected to the enzymatic treatment process in accordance with the present invention is preferably coarsely ground psyllium seed husk. Typically, commercially available coarsely ground psyllium seed husk will have a purity of about 70 wt. % –about 95 wt. %, preferably at least about 80 wt. %. Obviously, the process of the present invention may be used to treat both impure coarsely ground psyllium seed husk, as well as more highly refined psyllium products having a purity of 85 wt. % –98 wt. % and even in excess of 99 wt. % psyllium seed husk.

The enzymatic treatment of the present method is effective in the treatment of ground psyllium seed husk of very low purity and can also be applied to other materials containing the psyllium seed husk allergen-containing protein fractions in order to reduce the allergenicity of these other psyllium compositions.

These compositions may include other food ingredients and may contain flours, brans, seeds, cracked seeds, etc., in addition to the psyllium seed husk. The additional materials present in the composition may be non-allergenic or may be allergenic themselves. The process of the present invention functions to reduce the allergenicity of the psyllium seed husk present in the composition and, concurrently, reduces the allergenicity which may be present in the other components of the composition. For example, treatment of a composition containing psyllium seed husk and peanut flour will reduce the allergenicity of the psyllium seed husk protein fractions, as well as the allergenicity of the peanut flour proteins.

The psyllium seed husk and psyllium seed husk compositions which are obtained by the present process have reduced allergenicity and may be utilized to prepare conventional dietary and food compositions containing psyllium according to known recipes and using known methods.

Other features of the invention will become apparent in the course of the following descriptions of exemplary embodiments which are given for illustration of the invention.

EXAMPLES

Example 1

Two grams of coarsely ground psyllium seed husk (85% purity) were added to 200 ml of MOPS buffer (10 mM MOPS, 137 mM NaCl, 2.7 mM KCl and 5.0 mM $CaCl_2$, pH 7.0) in 250 ml polycarbonate centrifuge tubes. These tubes were then placed on a test tube rotator in a cold room (4° C.) and rotated end-over-end for 30 minutes. The tubes were then centrifuged at 600× g for 10 minutes. The supernatant was removed from the tubes and combined.

The combined supernatant was poured into a 1.0 l Erlenmeyer flask. Fifty units of Pronase E (Sigma) were added to the flask, the flask was capped with foil and incubated at 37° C. for 1 hour. During this time, the flask was gently agitated. A parallel control flask containing the psyllium extract but no enzyme was also capped, incubated and agitated. Pronase E contains protease enzymes immobilized on 4% beaded agarose. For purposes of the gel test, the Pronase E was separated from the reaction mixture by a centrifugation with a typical laboratory centrifuge operating at approximately 10,000× g.

Example 2

To a 1.0 l Erlenmeyer flask was added a 200 ml aliquot of the supernatant obtained in Example 1 with 100 units of PEM (proteolytic enzyme mixture available from Novo containing the proteases porcine trypsin, bovine trypsin and bovine chymotrypsin). The reaction mixture was incubated at 37° C. for 1 hour with gentle agitation. The proteolytic enzymes in the mixture were then inactivated by heating at 100° C. for 15 minutes.

Two control flasks were run in parallel with the flask of Example 2. In the first control, inactivated PEM was added to a 200 ml supernatant aliquot obtained by the procedure of Example 1. The PEM was inactivated by heating at 100° C. for 15 minutes prior to addition to the psyllium extract. A second control was prepared by adding 200 ml of MOPS buffer and 100 units of PEM to a 1.0 l flask. Both controls were incubated at 37° C. for 1 hour followed by heating at 100° C. for 15 minutes.

A 10 ml aliquot was removed from each of the Example 1 and Example 2 flasks as well as each of the control flasks and analyzed for free amino nitrogen. The results are shown in the table below.

TABLE

| Sample | Free Amino Nitrogen (mg/L) | Allergenicity |
|---|---|---|
| psyllium extract, no enzyme added | 1.46 | + |
| psyllium extract containing Pronase E (Example 1) | 2.26 | − |
| MOPS buffer containing active PEM | 2.92 | − |
| psyllium extract containing inactive PEM | 4.32 | + |
| psyllium extract containing active PEM (Example 2) | 4.84 | − |

After the aliquots had been taken from the reaction flasks for the free amino nitrogen analysis, the remainder of the reaction mixtures were separately lyophilized. The lyophilized material wa then tested for allergenicity. Results shown in the Table indicate that psyllium seed husk treated with enzymatically active protease enzymes has significantly less allergenicity than psyllium seed husk which is not treated or treated with inactive enzyme.

Example 3

Two grams of coarsely ground psyllium seed husk (85% purity) are added to 200 ml of MOPS buffer as in Example 1 in a 1.0 L Erlenmeyer flask. PEM (100 units) is then added to the flask and the flask is incubated at 37° C. for 1 hour with general agitation. The proteolytic enzymes are then deactivated by heating the flask at 100° C. for 15 minutes. The reaction mixture is then lyophilized and tested for allergenicity. The lyophilized material has substantially reduced allergenicity when compared with the control flask containing inactive PEM.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A method of reducing the allergenicity of psyllium seed husk, by proteolytically degrading the allergenic coat proteins of the husk comprising: (a) slurring said psyllium seed husk with water to provide a slurry containing about 1–50% by weight of solids; and (b) treating the slurry from step (a) with an effective amount of a protease selected from the group consisting of trypsin, chymostrypsin and pronase E, for a time ranging from about 1 minute to about 30 minutes, at a temperature of about 25° C. to about 45° C. and a pH ranging from about 2 to about 10.

2. The method of claim 1, wherein said slurry comprises about 5–30 wt. % solids.

3. The method of claim 1, wherein the amount of protease used in said contacting step is from about 100 to about 2,000 IU per liter of slurry.

4. The method of claim 1, further comprising inactivating said protease and drying said slurry to produce a dried psyllium seed husk.

5. The method of claim 1, wherein said contacting temperature is about 37° C.

* * * * *